R. H. PEVERLY.
Mariners' Compass.

No. 15,017.

4 Sheets—Sheet 1.

Patented June 3, 1856.

R. H. PEVERLY.
Mariners' Compass.

4 Sheets—Sheet 2.

No. 15,017.

Patented June 3, 1856.

R. H. PEVERLY.
Mariners' Compass.

No. 15,017.

4 Sheets—Sheet 3.

Patented June 3, 1856.

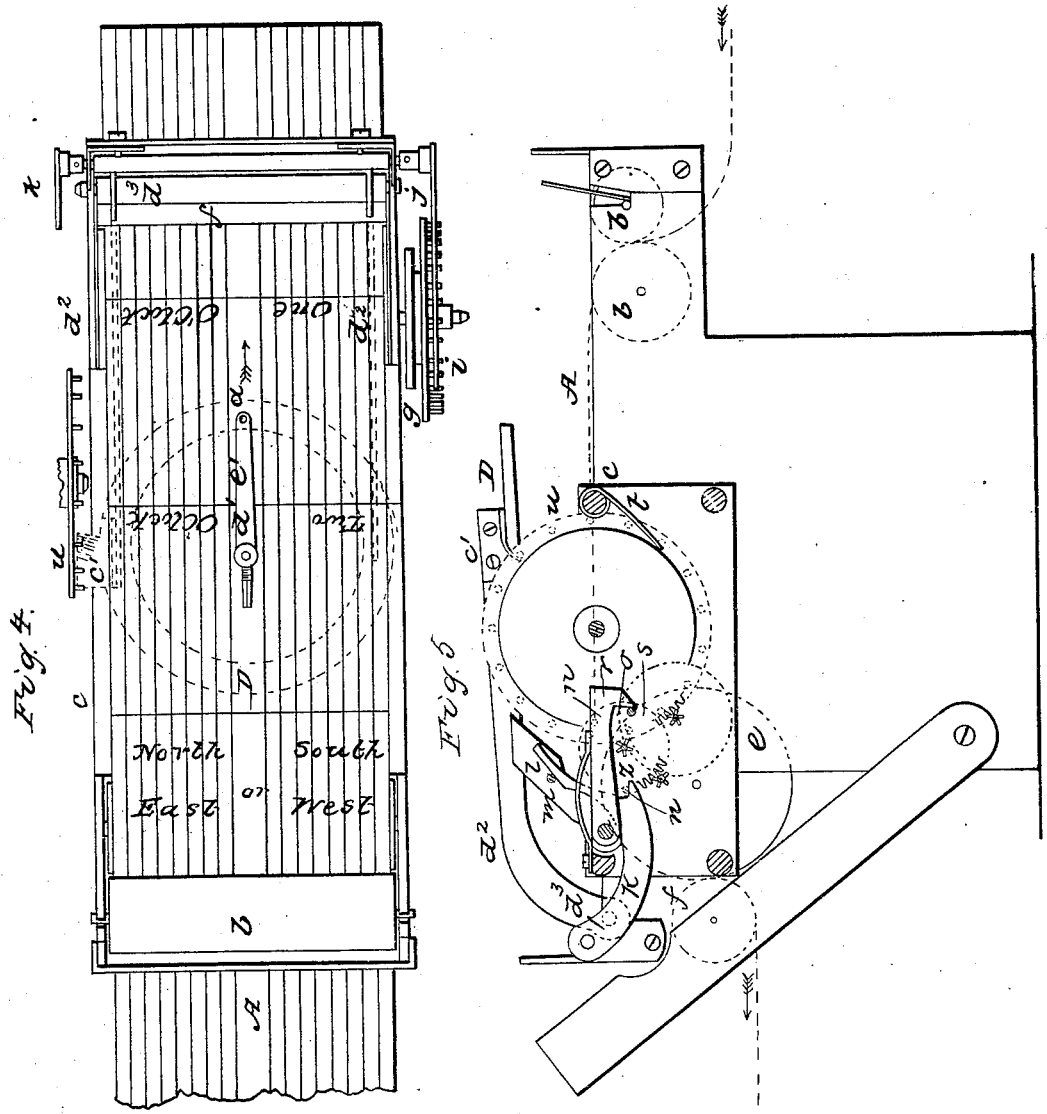

UNITED STATES PATENT OFFICE.

R. H. PEVERLY, OF CHELSEA, MASSACHUSETTS.

IMPROVEMENT IN SELF-REGISTERING SHIPS' COMPASSES.

Specification forming part of Letters Patent No. 15,017, dated June 3, 1856.

*To all whom it may concern:*

Be it known that I, R. H. PEVERLY, of Chelsea, in the county of Suffolk and State of Massachusetts, have invented a certain new and useful Improvement in the Self-Registering Ship's Compass, of which the following is a full, clear, and exact description, reference being had to the accompanying drawings, which form part of this specification, and in which—

Figure 1:
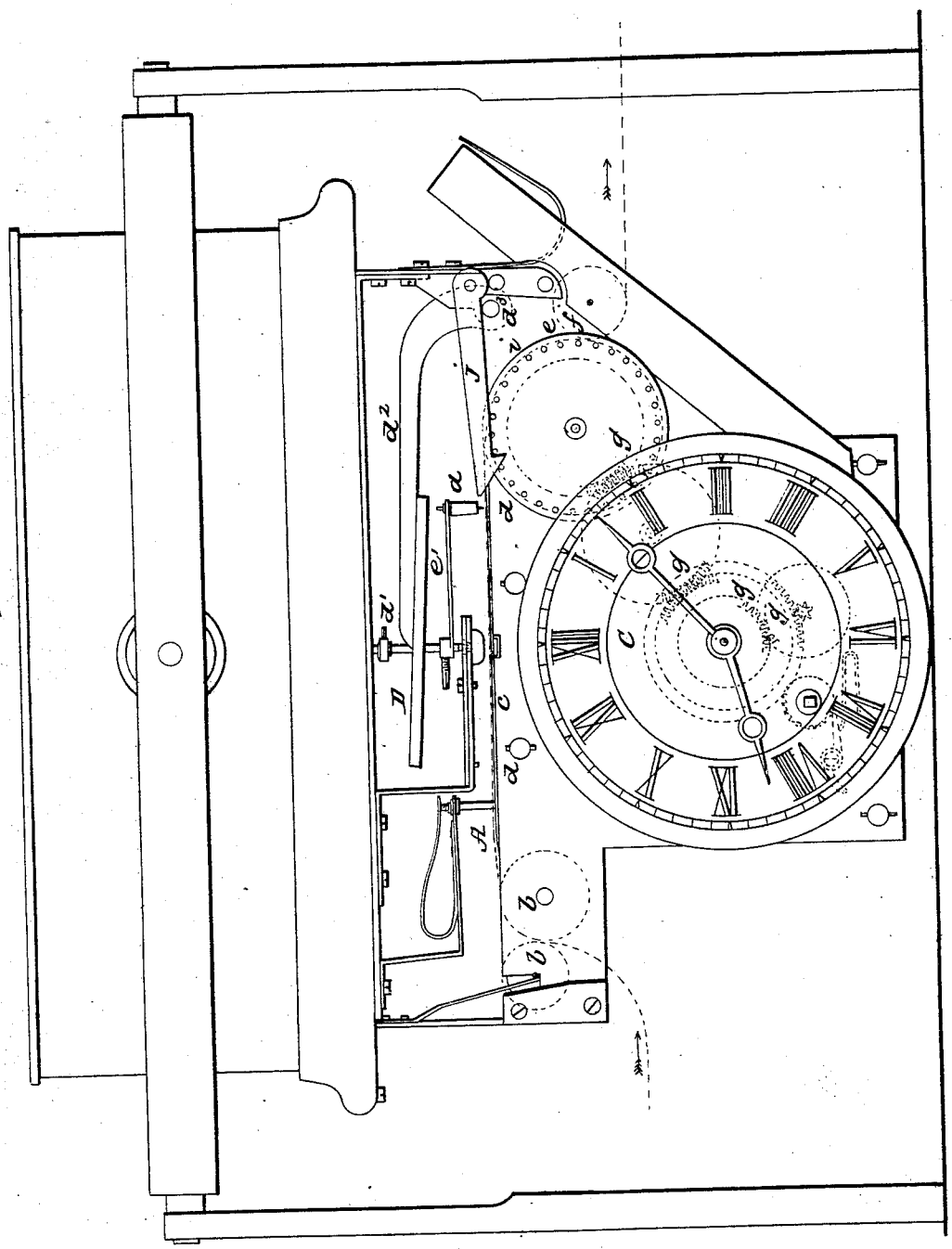
Figure 2:
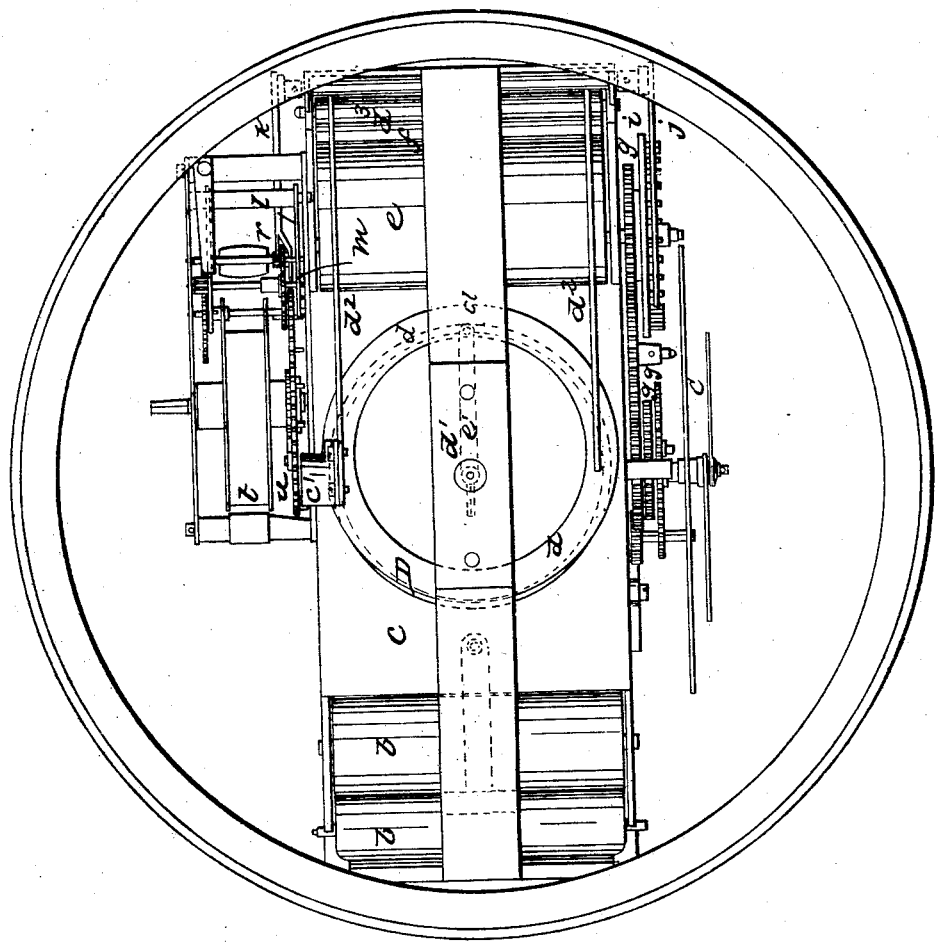
Figure 3:
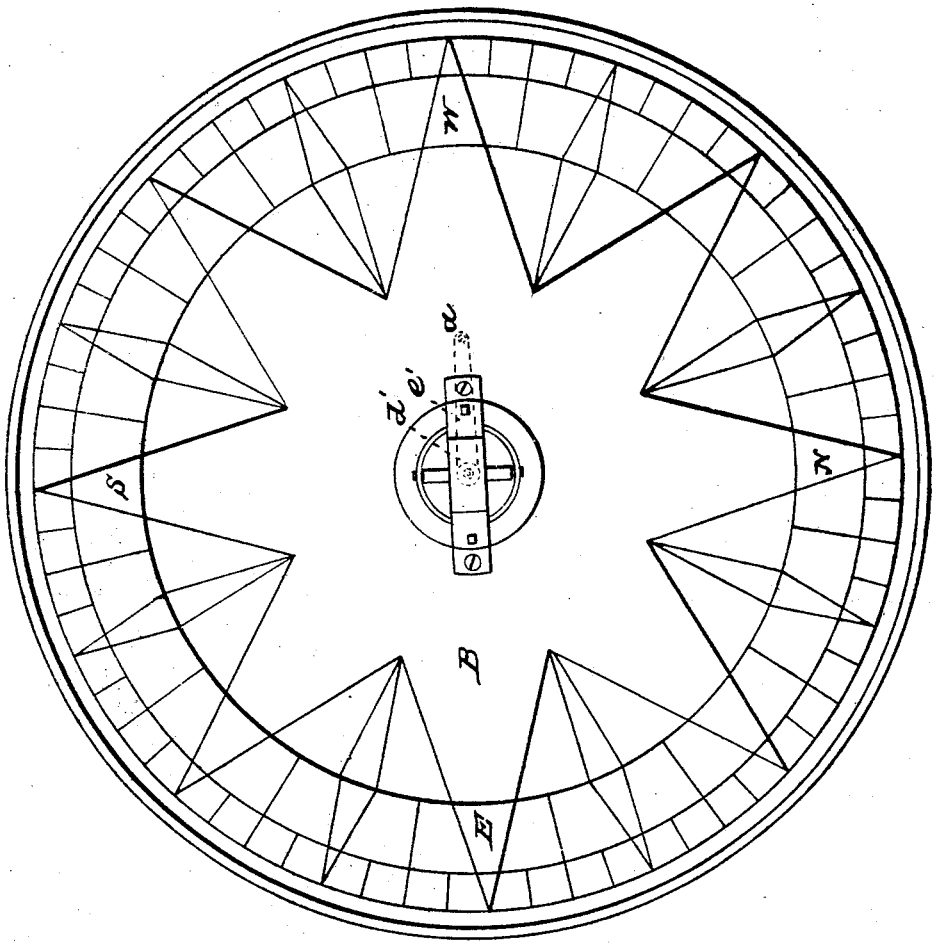

Figure 1 represents a side or vertical view of the compass with a face view of the clock and in elevation certain of the appurtenances which operate in connection with the compass and clock to effect the self-registering of the ship's course. Fig. 2 represents a plan of the self-registering compass with the needle-card removed; Fig. 3, a plan of the needle-card and pointer detached; Fig. 4, a plan of a strip of paper in position for having the courses indicated upon it with certain of the details employed to accomplish the same; Fig. 5, a side elevation viewed from the opposite side of the compass to that showing the clock-face of certain of the details employed in the marking or indicating process, and showing in red lines the relative position of the paper on which the courses are indicated.

It has before been proposed to make a ship's compass self-registering by means of clock-work operating in connection with the needle for the purpose of raising and lowering at fixed intervals during the twenty-four hours the needle-pivot, so that by means of a screw, nut, and pointer, together with a circular card made up of three needles fixed to a sheet of mica and the mica covered with velvet, forming a punctured-basis to render easy the action of the pointer and prevent stoppage of the compass-needle by or when the act of puncturing or marking takes place. The changes in the direction of the ship's course have been determined by first setting the axis or diametral line of the circular marking-card in line with the ship's axis, whereby as the needle points north the punctures or marks made at each of the fixed intervals will indicate the deviations of said axis with reference to the needle, and the succession of points in nearly a continuous line will show to the eye the course of the route taken. This mode of making the compass self-registering is highly defective. It is very restricted in its action as regards the length of time without objectionable renewal of the marking-card. It is capable of indicating during the voyage the variations of the course, and unless frequently watched a mistake is easily made in apportioning to any one interval of time during the day the actual course taken, as the changes in relative position of the needle and circular marking-card are concentric, and it may happen that the same puncture or mark will, as in the instance of the ship's "tacking," veering around, or returning, be struck twice or oftener at different intervals of time, which of course makes the register deceptive and unreliable, and such a method presents a curved line for the mean travel, which renders the accurate measurement of the deviations from a straight course both difficult and the reading of any portion or the whole confusing to the eye of the common sailor and contrary to a chart-like exposition of the course taken. Besides these, there are many other objections to such or equivalent modes of making the compass self-registering, the most or all of which, and especially those named, it is the object of my invention to avoid.

My improvement proposes to make the compass register in an advantageous manner the course permanently on a continuous strip of paper or other material at known intervals for either a part of or the whole voyage without changing of necessity the marking-strip, and apportioning with a clearly readable and positive certainty in a chart-like manner the actual deviations for the several periods and the general course for the whole without any risk of error, as a new surface is presented for every successive puncture or mark.

In connection with the ship's compass I arrange a clock or other time-piece that may serve alike to indicate the time, operate the feed of the marking-strip, and release, let loose, or operate at certain intervals the mechanism which effects the mark.

The strip of paper A (represented in the accompanying drawings) may be of indefinite length and wound upon a roll similar to the roll used in telegraphic machines. This strip is fed along by clock-work under the compass, and the deviations on either side from a central line, marked by pencil-point, may be measured by scale, and thus the various courses steered in a given time be determined; or the paper may be ruled, as shown in the drawings, longitudinally with lines, indicative of so many points of the compass, on either side of a central line or space, which is the mean course of the ship's sailing, the said longitudinal and parallel lines representing on the one side north or east and on the other side south or west, according to what the mean course may be, and the said strip A be further divided transversely into spaces representing portions or intervals of time. The needle-card B should be so fitted on its pivot as to admit of its being lifted off, in order that the pointer or marker $a$, which is connected with it, may be set at commencing to register in the "mean course" or central line of the strip.

The strip A is introduced between rollers $b$ $b$ along and over a bed or plate $c$, in which is a circular groove $d$ to receive the point of the marker $a$ and prevent its being injured when struck through the paper. The paper then passes down between rollers $e$ $f$ at the opposite end, the larger one $e$ of these latter-named rollers being the feed or drawing roller to the strip. This feed-roller $e$ is caused to revolve by gear $g$, connecting it with or forming part of the time-piece or clock C. On the front end of the axis of the drawing-roller $e$ is a peg crown-wheel $i$, that serves as it slowly rotates to gradually raise tooth by tooth at fixed or regular intervals of time and let suddenly drop alternately a releasing catch or lever $j$, Figs. 1, 2, and 4, which has connected with its axis at the opposite side of the apparatus an arm $k$. This arm $k$ (see more particularly Figs. 2 and 5) has two forked projections, the one of which as the releasing-lever $j$ rises lifts on a lever $l$ by means of a stud $m$, and the other fork $z$ serves to receive or act as a stop at certain intervals to the stud $n$ of a wheel $o$, which forms one of a series of wheels that, together with a winding-up spring $t$, constitutes an independent or additional clock-gear for operating the hammer D, that strikes upon the pointer $a$ to effect the register. On the same shaft as the last-named lever $l$ is also a ratchet-arm or catch $r$, that bites on a stud $s$ of another wheel of this clock-gear which has an intermittent action given it by the arm $k$ toward the close of its lift, and of course toward the close of the lift of the releasing-lever $j$, letting loose the one stud $s$, which relieves the spring $t$ of restraint and admits of the clock-gear moving and with it the spur and crown wheel $u$ to raise the hammer D. This movement is but short, and stops when the stud $n$ reaches and rests on the small fork $z$ of the arm $k$, which, when it shortly afterward drops with the specified periodical dropping of the release-lever $j$, allows by letting loose the stud $n$ of a further movement or intermittent action of the clock-gear till the other stud $s$ is again stopped by the ratchet-arm $r$, that with the other levers or arms is then down in its original position. In what I have termed the "further" or "second" movement of the clock-gear the hammer D is caused to suddenly fall by the passage of one of the peg-teeth in the spur and crown wheel $u$, which raised it past or from under the point of the hammer-raiser $c'$, and so on at certain and regular periods of time is this action repeated and the hammer is thus operated independently, as it were, though in concert with the clock producing the feed of the marking-strip, whereby a free, easy, and certain action of the hammer is insured without retarding or affecting the movement of the time-piece or clock proper C, so that the said clock is made more reliable as to its keeping correct time and letting loose at regular intervals the release-lever which governs the action of the mechanism operating the hammer than if the said clock had to carry the weight of the hammer and operate it, and this regular action of the hammer at reliable fixed intervals of time in a relative connection to or with the feed of the marking-strip is of much importance in effecting a perfect register.

Of course other releasing arrangements under the influence of the clock which effects the feed for letting loose and governing a separate clock-gear to operate the hammer, as specified, may be used, or the operation of the hammer may be effected concurrently with the feed of the strip, as set forth, by any suitable means.

The hammer D may consist of a ring encircling the pivot $d'$ of the compass-needle and arranged over the circular groove $d$ in the bed $c$. This hammer may be carried by arms $d^2$ freely hung on or connected with a free axis $d^3$, so as to admit of its easy operation by the crown-wheel $u$ acting on or in concert with the raiser $c'$ fast to the hammer.

The pointer, pricker, or marker $a$ is connected with the compass-needle pivot $d'$ by a spring-arm $e'$, which while it admits of the hammer in striking depressing the pointer so as to prick or mark the registering-strip, it causes the pointer quickly to free itself from the paper, so as to present but little or no obstruction to the feed of the paper, and it does away with all undue agitation of the needle, and though connected with the needle so as to occupy its specified relative position therewith and the mean course or center line of the strip at starting it in effecting the mark and recovering itself does not require that objectionable movement up and down of the needle-pivot which was specified in the circular card device at the onset. As the pointer is stationary as regards the direction it assumes or is set in with the needle, it is obvious that as the ship varies her course the deviations from the mean course will be registered on either side of the center line of the strip A by the pointer coming down at intervals, as specified, and marking or pricking the paper, which in continuing to be fed necessarily presents a fresh surface each time the pointer acts, and by the longitudinal divisions on the strip representing points of the compass and the transverse divisions intervals of time, the courses steered for the respective periods are easily determined and the entire course read in a straight line, as it were, even for the whole voyage, at a glance. The short time the pointer is in the paper, compared with the time elapsing before the next impression, allows the needle to recover from its disturbance, while the slight disturbance which is produced makes the indications of the needle more reliable.

I do not claim as new any of the within-described devices separately considered, and am aware that various electro-magnetic and other instruments have been made to record automatically their indications and periods of such on a clock-fed continuous fillet or strip. This, therefore, as a principle or system of automatic registration I do not claim; but I do claim as new and useful and desire to secure by Letters Patent—

Registering permanently and automatically the ship's courses on a continuous strip of paper or other material at known or fixed intervals of time for a part or the whole of the voyage, substantially as specified, by means of the continuous clock-feed to the fillet or strip, in combination with the ship's compass and marker arranged and operating together essentially as set forth.

In testimony whereof I have hereunto subscribed my name.

R. H. PEVERLY.

Witnesses:
 ALBERT BISBEE,
 JOSEPH D. MOON.